July 18, 1967  L. E. DAY  3,331,474
AUXILIARY BRAKE MEANS FOR HIGHWAY TRANSPORT TRUCK
Filed Jan. 29, 1965
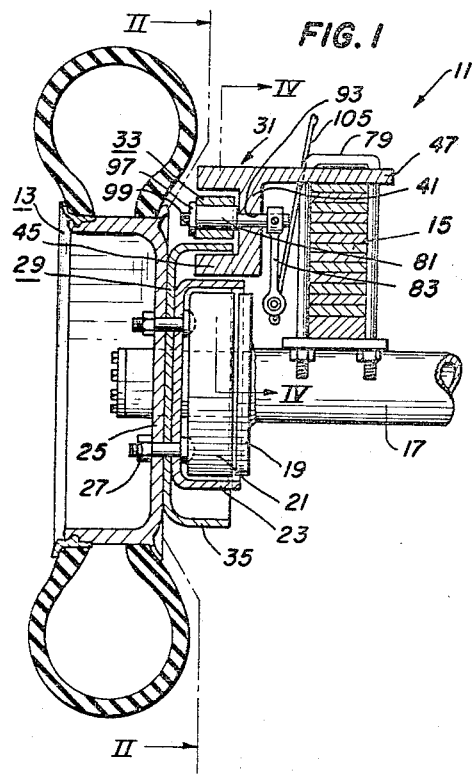
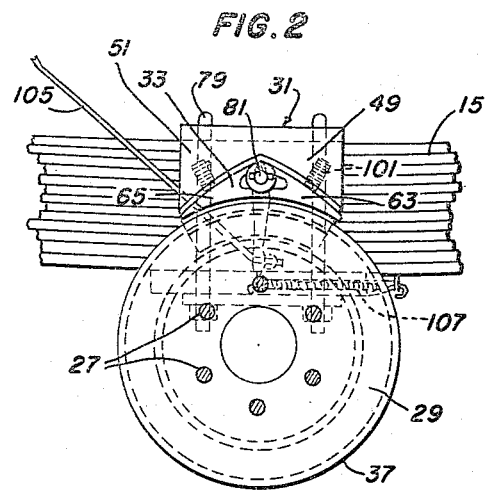
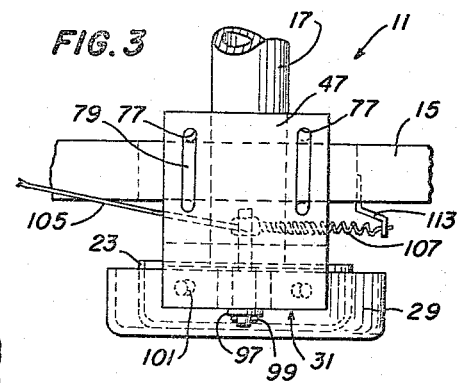
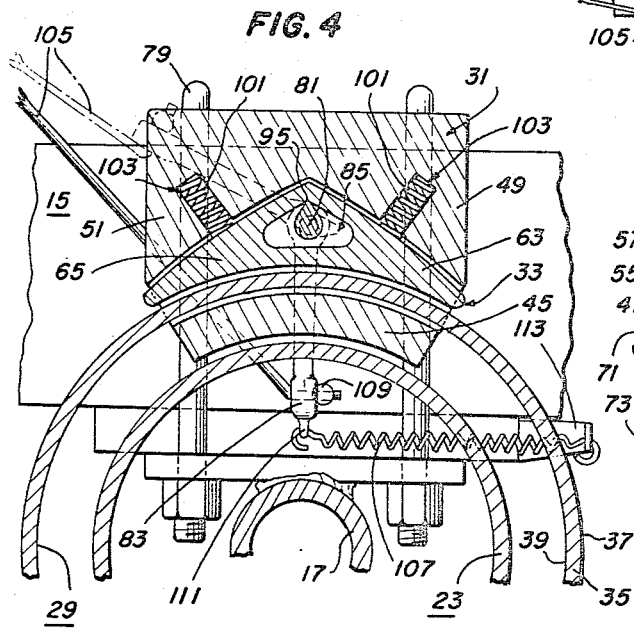
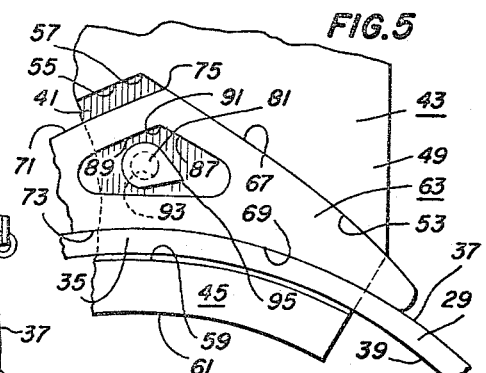
INVENTOR.
LEON E. DAY
BY John R. Walker, III
Attorney

United States Patent Office 3,331,474
Patented July 18, 1967

3,331,474
AUXILIARY BRAKE MEANS FOR HIGHWAY TRANSPORT TRUCK
Leon E. Day, West Memphis, Ark., assignor of fifty percent to Charles S. Riggan, Memphis, Tenn.
Filed Jan. 29, 1965, Ser. No. 429,169
6 Claims. (Cl. 188—76)

This invention relates to an auxiliary brake means for a highway transport truck, including the trailer thereof, or like vehicle.

The typical highway transport truck includes a compressed air brake system for slowing or stopping the truck. Such a regular air brake system functions adequately under most highway or driving conditions. However, there are times when auxiliary braking or stopping power is desirable. In a heavily loaded truck traveling down a steep grade or mountainous road, much braking force or stopping power is needed to keep the vehicle under control and traveling at a safe speed.

It often occurs, in braking a truck on a long downhill grade, that the brake shoes and drum at each wheel of the vehicle become very hot, and the braking action is impaired or ineffective. When this occurs, there is considerable likelihood that the vehicle will gain a hazardous speed and perhaps run out of control and overturn or crash.

A primary object of the present invention is to provide an auxiliary or emergency brake means of sufficient capacity to stop the travel of a loaded truck in the event of speeding or other hazardous conditions and when the regular air brake system becomes ineffective for slowing the vehicle.

A further object is to provide an auxiliary brake means which operates quickly and positively.

A further object is to provide an auxiliary brake means which may readily be installed on a vehicle without unduly modifying the existing structure of the vehicle.

A further object is to provide an auxiliary brake means which may be used as a parking brake.

A further object is to provide means whereby a driver can hold his truck or like vehicle in a stopped position without causing the drum to become egg-shaped or bell-mouthed due to the applying of brakes while the drum is hot.

A further object is to provide a strong, durable and substantially simple auxiliary braking means which does not require hydraulic or pneumatic force for the operation thereof, and such means requiring minimum maintenance.

A further object is generally to improve the design and construction of auxiliary brake means in a vehicle.

The means by which the foregoing and other objects of the present invention are accomplished and the manner of their accomplishment will be readily understood from the following specification upon reference to the accompanying drawings, in which:

FIG. 1 is a vertical sectional view of the apparatus of the present invention in conjunction with a wheel and a fragmentarily illustrated spring and axle assembly of a truck.

FIG. 2 is a vertical sectional view taken as on the line II—II of FIG. 1.

FIG. 3 is a top view taken as from the illustration of FIG. 2.

FIG. 4 is an enlarged vertical sectional view taken as on the line IV—IV of FIG. 1.

FIG. 5 is a somewhat schematic showing of the brake apparatus in a braked or locked disposition.

The brake means of the present invention preferably is adapted to be used in pairs; that is, on a respective wheel and axle assembly or so-called axle of a vehicle, preferably there will be a right brake apparatus and a left brake apparatus.

For the purpose of description, however, the present invention will be illustrated and described with reference to one side of the vehicle, that is, to the right side apparatus and the conjunctively associated parts, as shown in FIG. 1.

It should further be noted that, for purposes of description, the brake apparatus will be described as being disposed substantially directly over the truck axle and with the forward end of the vehicle being toward the right in FIGS. 2-5. It is, of course, understood that the right side apparatus (as shown) and the left side apparatus are substantially alike, except for the opposite arrangement of the various parts.

Referring to FIG. 1, the brake apparatus is generally indicated by the numeral 11 and is shown in conjunction with a wheel 13 and a spring and axle assembly 15, 17. Axle 17 includes a backing plate 19 securely attached perpendicularly to the axle. Brake shoes 21 are movably supported from backing plate 19, and an inwardly flanged brake drum 23 is secured on hub portion 25 of wheel 13 by wheel bolts 27. Suitable bearing means, not shown, support the spring and axle assembly 15, 17 from wheel 13. Suitable means, not shown, are provided for actuating brake shoes 21 towards and away from brake drum 23 for braking the vehicle. The above-described parts and the construction shown in FIG. 1 is typical. Brake shoes 21 and brake drum 23, along with the means for actuating shoes 21, comprise the regular braking means for the vehicle.

Apparatus 11 includes basically a drum member 29, a support member 31, a wedge member 33, and control means for holding and moving wedge member 33. Drum member 29 includes a flanged portion 35 having an outer cylindrical surface 37 and an inner cylindrical surface 39. Drum member 29 is concentrically secured on wheel 13 with flanged portion 35 surrounding the flange of brake drum 23. Drum member 29 is interposedly secured between hub portion 25 of wheel 13 and brake drum 23 by wheel bolts 27.

Support member 31 includes, principally, a base portion 41, an anvil portion 43, and a back-up portion 45. Anvil portion 43 and back-up portion 45 are disposed substantially horizontally and are integrally secured to the substantially vertically disposed base portion 41. Support member 31 is fixedly mounted from the spring and axle assembly 15, 17 of the vehicle. A mounting portion 47, integrally formed of support member 31, preferably provides the means for mounting the support member, with anvil portion 43 and back-up portion 45 on opposite sides of flanged portion 35 of drum member 29 and spaced respectively from the outer and inner surfaces 37, 39 of the flanged portion 35.

Anvil portion 43 includes a pair of portions including a forward portion 49 and a rearward portion 51 formed respectively along the forward and rearward portions of base portion 41. Forward and rearward portions 49, 51 are respectively triangularly shaped and include lower surfaces 53, 55, respectively. Lower surfaces 53, 55 are curved slightly and intersect along an apex juncture 57. Surfaces 53, 55 define somewhat an inverted V, with the respective surfaces being disposed obliquely and substantially tangentially of outer cylindrical surface 37 of drum member 29.

Back-up portion 45 is disposed between flanged portion 35 of drum member 29 and the flange of brake drum 23. Back-up portion 45 includes an upper curved surface 59 and a lower curved surface 61. Upper surface 59 has a curvature corresponding to the inner cylindrical surface 39 of flanged portion 35 of drum member 29 and is spaced a slight distance from the inner cylindrical surface. Lower surface 61 of back-up portion 45 is of a concave curvature and is spaced from the outside cylindrical surface of brake drum 23.

Wedge member 33 is of substantially triangular configuration and is disposed between anvil portion 43 of support member 31 and flanged portion 35 of drum member 29. Wedge member 33 includes a pair of wedge portions including a forward portion 63 and a rearward portion 65. Forward portion 63 has converging surfaces including an upper surface 67 and a lower surface 69; and rearward portion 65 has converging surfaces including an upper surface 71 and a lower surface 73. Lower surfaces 69, 73 form a continuous concave surface having a curvature substantially the same as the outer cylindrical surface 37 of drum member 29. Upper surfaces 67, 71 are preferably slightly curved and of a curvature corresponding respectively to the curvature of surfaces 53, 55 of anvil portion 43. Surfaces 67, 71, respectively of forward and rearward portions 63, 65, intersect along an edge 75 extending transversely of wedge member 33.

The means for securely mounting support member 31 from the wheel and axle assembly 15, 17 of the vehicle preferably is as follows: Four bore openings 77 are provided in mounting portion 47 of support member 31. U-bolt assemblies 79 extend respectively through openings 77 and securely clamp mounting portion 47 and support member 31 along the top leaf of spring 15. It will be understood that, in some instances, such as in a tandem wheel arrangement where the spring is not directly over the axle, the support member 31 can be bolted directly to the axle.

The control means for holding and moving wedge member 33 preferably includes a camshaft 81, a lever 83, and actuating means attached to lever 83 for moving camshaft 81. A substantially triangular opening 85 extends horizontally through wedge member 33. The interior surfaces defining opening 85 include two substantially flat surfaces 87, 89. Surfaces 87, 89 are respectively in the forward and rearward portions of wedge member 33, and extend upwardly and intersect at an apex juncture 91. A cylindrical opening 93 is disposed medially of and extends horizontally through base portion 41. Camshaft 81 is journaled in opening 93 and extends through triangular opening 85 of wedge member 33. Camshaft 81 includes an edge-like lobe 95 extending horizontally and offset somewhat from the center axis of camshaft 81. A flat washer 97 and pin 99 prevent outward axial movement of wedge member 33. Lever 83 is secured to the inward end of camshaft 81 and prevents axial movement of the shaft with respect to support member 31. Two coiled compression springs 101 are interposedly mounted between wedge member 33 and member 31. Springs 101 are respectively secured in sockets 103 in anvil portion 43 of support member 31 and are respectively perpendicularly arranged relative to lower surfaces 53, 55 of anvil portion 43. Springs 101 are respectively equi-distant from camshaft 81 and urge apex juncture 91 of wedge member 33 into engagement with camshaft lobe 95. Springs 101 are of equal tension and effect a balanced disposition for wedge member 33.

The control means of wedge member 33 also includes actuating means for actuating lever 83 and camshaft 81 and for moving the wedge member into and out of engagement with the outer cylindrical surface 37 of drum member 29. The actuating means preferably includes a cable 105 and a coiled tension spring 107. Cable 105 extends through an opening in the end of lever 83 and is secured by a cable clamp 109. Spring 107 is secured at one end thereof by an apertured ear portion 111 on lever 83 and at the other end thereof by an apertured bracket 113 secured to the truck spring pad of the vehicle. The end of cable 105, remote from that end fastened to lever 83, is provided with a knob or handle, not shown, for manually pulling the cable. The placement of the knob or handle means should be convenient to the operator of the vehicle.

Apparatus 11, as illustrated in the drawings and heretofore described, is a bi-directional embodiment of the present invention; that is, the apparatus as shown is adapted to provide a braking action whether the vehicle it traveling forward or in reverse. Referring to the drawings, it will be seen that the apparatus is substantially symetrically arranged. It is contemplated, however, with only slight modification to support member 31 and wedge member 33, that the apparatus may be constructed for unidirectional travel, that is, for braking the vehicle when traveling in a forward direction. In such an embodiment, only the forward portions 49, 63 respectively of anvil portion 43 and wedge member 33 would be employed; the apparatus would then not be symmetrically constructed.

By way of exemplification, the use of the apparatus will be described in stopping the vehicle when traveling in a forward direction or when wheel 13 is moving in a clockwise direction. Stopping the vehicle in an instance such as this, the operator would pull cable 105 and move lever 83 to a position as shown in broken lines in FIG. 4. This would move camshaft lobe 95 away from apex juncture 91 of wedge member 33 and allow the wedge member to engage the outer cylindrical surface 37 of drum member 29. The brake drum, traveling in a clockwise direction, would carry the forward portion 63 of wedge member 33 into engagement with forward anvil portion 49 of support member 31. The inertial force of the vehicle would carry wedge member 33 into a locked disposition between drum member 29 and anvil portion 43 of support member 31 to stop the vehicle. Back-up portion 45 of support member 31 provides means for preventing undue distortion or deformation of drum member 29. Should the locking force of wedge member 33 be very strong, flanged portion 35 of drum member 29 would be urged inwardly, and the inside cylindrical surface 39 of the drum would engage the upper surface 59 of back-up member 45. When it is desired to release apparatus 11, the operator would release cable 105 to permit lever 83 to return to the solid line position shown in FIG. 4, and move the vehicle in a reverse direction. Reversing the vehicle would cause drum member 29 to move in a counterclockwise direction and carry wedge member 33 into the position shown in FIGS. 2 and 4.

The apparatus of the present invention may be readily installed on the typical highway vehicle or truck. It may optionally be used for checking the speed of a vehicle or as a parking brake for the vehicle. The brake means of the present invention is strong and durable and provides trouble-free operation. In summary, the present invention provides a practical auxiliary brake means for a vehicle.

Although the present invention has been described in some detail by way of illustration and example for purposes of clarity or understanding, it is to be understood that it is not to be so limited since changes and modifications may be made therein which are within the full intended scope of this invention as hereinafter claimed.

I claim:

1. In a highway transport truck or like vehicle having a ground engaging wheel and a spring and axle housing assembly supported from said wheel, an auxiliary brake means for stopping the travel of said vehicle comprising a drum member having an outer cylindrical surface and with said drum member being concentrically secured to said wheel, a support member having an anvil portion with said anvil portion having a lower surface, means fixedly mounting said support member from said spring and axle assembly with said lower surface of said anvil portion disposed obliquely and tangentially of said cylindrical surface of said drum member and disposed at a fixed distance from said drum member cylindrical surface, a wedge member having convergingly arranged surfaces including an upper surface and a lower surface and with said wedge member being arranged between said outer cylindrical surface of said drum member and said lower surface of said anvil portion with said wedge member upper surface being contiguous said anvil portion lower surface and said wedge member lower surface being contiguous said drum member cylindrical surface, and wedge member control means including means for holding said wedge member away from said outer cylindrical surface of said drum member and means for moving said wedge member into engagement with said outer cylindrical surface of said drum member.

2. The auxiliary brake means of claim 1 in which said support member includes a pair of oppositely arranged anvil portions including a forward portion and a rearward portion respectively, having lower surfaces, said lower surfaces being respectively arranged obliquely and tangentially of said outer cylindrical surface of said drum member, and in which said wedge member includes a pair of oppositely disposed wedge portions including a forward portion and a rearward portion with each wedge portion including convergingly arranged surfaces including an upper surface and a lower surface, and in which said wedge member is disposed between said pair of anvil portions of said support member and said cylindrical surface of said drum member with said pair of wedge portions being adjacent respective portions of said pair of anvil portions.

3. In a highway transport truck or like vehicle having a ground engaging wheel and a spring and axle assembly supported from said wheel, an auxiliary brake means for stopping the travel of said vehicle comprising a drum member including a flange portion having an outer cylindrical surface and an inner cylindrical surface concentric with said outer surface and with said drum member being secured concentrically to said wheel, a support member including a pair of oppositely disposed anvil portions respectively having lower surfaces and a back-up portion having an upper surface, means securely mounting said support member from said spring and axle assembly with said lower surfaces respectively of said pair of oppositely disposed anvil portions being disposed obliquely and tangentially of said cylindrical surface of said drum member and with said upper surface of said back-up member being spaced a slight distance from said inner cylindrical surface of said drum member, a wedge member of substantially triangularly-shaped configuration having a pair of oppositely disposed wedge portions with each wedge portion having respectively converging surfaces including an upper surface and a lower surface, said wedge member being disposed between said anvil portions of said support member and said outer cylindrical surface of said drum member and with said pair of wedge portions being adjacent respective portions of said pair of anvil portions, and wedge member control means including a means for holding said wedge member away from said outer cylindrical surface of said drum member and a means for moving said wedge member into engagement with said outer cylindrical surface of said drum member.

4. In a highway transport truck or like vehicle having a ground engaging wheel and a spring and axle assembly supported from said wheel, an auxiliary brake means for stopping the travel of said vehicle comprising a drum member including a flange portion having an outer cylindrical surface and an inner cylindrical surface concentric with said outer cylindrical surface and with said drum member being secured concentrically to said wheel; a support member including a base portion, a pair of oppositely disposed anvil portions respectively having lower surfaces, and a back-up portion having an upper surface; means securely mounting said support member from said spring and axle assembly with said lower surfaces respectively of said pair of oppositely disposed anvil portions being disposed obliquely and tangentially of said outer cylindrical surface of said drum member and with said upper surface of said back-up member being spaced a slight distance from said inner cylindrical surface of said drum member, a wedge member of substantially triangularly-shaped configuration having a pair of oppositely disposed wedge portions with each portion having converging surfaces including an upper surface and a lower surface, said wedge member being disposed respectively between said anvil portions of said support member and said outer cylindrical surface of said drum member, said pair of wedge portions being adjacent respective portions of said pair of anvil portions; said drum member, said pair of anvil portions of said support member, and said wedge member being substantially in a vertical plane extending perpendicularly of the axis of said wheel; control means including means for holding and means for moving said wedge member comprising a substantially triangular opening extending horizontally through said wedge member, the interior surfaces defining said opening including two substantially plane surfaces extending upwardly and intersecting at an apex juncture extending horizontally, a cylindrical opening extending horizontally through said base portion of said support member, a camshaft journaled in said cylindrical opening and extending through said triangular opening of said wedge member, said camshaft having an edge-like camlobe extending horizontally and engaging said apex juncture of said interior surfaces of said opening of said wedge member, two springs urging said apex juncture into engagement with said camshaft lobe and including a spring respectively between adjacent portions of said pair of anvil portions of said support member and said pair of wedge portions of said wedge member, a lever secured on said camshaft, and actuating means for actuating said lever and said camshaft and for moving said wedge member into and out of engagement with said outer cylindrical surface of said drum member.

5. The auxiliary brake means of claim 4 in which said actuating means includes a cable member attached to said lever and adapted to be manually pulled to move said wedge member into engagement with said drum member.

6. In a highway transport truck or like vehicle having a ground engaging wheel including a brake drum and a spring and axle assembly supported from said wheel, an auxiliary brake means for stopping the travel of said vehicle comprising a drum member including a flange portion having an outer cylindrical surface and an inner cylindrical surface concentric with said outer cylindrical surface, said drum member being secured concentrically to said wheel and with said flange portion disposed circumferentially around the brake drum of said ground engaging wheel; a support member including a base portion, a pair of oppositely disposed anvil portions respectively having lower surfaces, and a back-up portion having an upper surface; means securely mounting said support member from said spring and axle assembly with said lower surfaces respectively of said pair of oppositely disposed anvil portions being disposed obliquely and tangentially of said outer cylindrical surface of said drum member and with said upper surface of said back-up member being spaced a slight distance from said inner cylindrical surface of said drum member, a wedge member of substantially triangularly-shaped configuration having a pair of oppositely disposed wedge portions with each portion having converging surfaces including an upper surface and a lower surface, said wedge member being disposed respectively between said anvil portions of said support member and said outer cylindrical surface of said drum member, said pair of wedge portions being adjacent respective portions of said pair of anvil portions; said drum member, said pair of anvil portions of said support member, and said wedge member being substantially in a vertical plane extending perpendicularly of the axis of said wheel; control means including means for holding and means for moving said wedge member comprising a substantially triangular opening extending horizontally through said wedge member, the interior surfaces defining said opening including two substantially plane surfaces extending upwardly and intersecting at an apex juncture extending horizontally, a cylindrical opening extending horizontally through said base portion of said support member, a camshaft journaled in said cylindrical opening and extending through said triangular opening of said wedge member, said camshaft having an edge-like camlobe extending horizontally and engaging said apex juncture of said interior surfaces of said opening of said wedge member, two springs urging said apex juncture into engagement with said camshaft lobe and including a spring respectively between adjacent portions of said pair of anvil portions of said support member and said pair of wedge portions of said wedge member, a lever secured on said camshaft, and actuating means for actuating said lever and said camshaft and for moving said wedge member into and out of enaggement with said outer cylindrical surface of said drum member.

References Cited
UNITED STATES PATENTS

| | | | |
|---|---|---|---|
| 627,947 | 6/1899 | Wood | 188—136 |
| 660,186 | 10/1900 | Goettman | 188—136 |
| 1,306,404 | 6/1919 | Coho | 188—135 |
| 3,170,712 | 2/1965 | Hildebrandt et al. | 280—124 |

FOREIGN PATENTS

| | | |
|---|---|---|
| 979,576 | 12/1950 | France. |
| 2,719 | of 1877 | Great Britain. |

MILTON BUCHLER, *Primary Examiner.*

B. S. MOWRY, *Assistant Examiner.*